United States Patent [19]

Weman

[11] 4,037,873
[45] July 26, 1977

[54] CAR SEAT WITH SLACK ROLL-UP MECHANISM

[75] Inventor: Per Olof Weman, Norderstedt, Germany

[73] Assignee: N.V. Klippan S.A., Haasrode, Belgium

[21] Appl. No.: 665,350

[22] Filed: Mar. 9, 1976

[30] Foreign Application Priority Data

Mar. 11, 1975 Germany .............................. 2510726

[51] Int. Cl.² ........................................... A62B 35/00
[52] U.S. Cl. .................................................. 297/388
[58] Field of Search ....................... 297/388, 389, 385; 244/122 R, 122 B; 280/744; 242/107.4, 107.7

[56] References Cited

U.S. PATENT DOCUMENTS

| 3,695,697 | 10/1972 | Stoffel | 297/385 |
| 3,856,351 | 12/1974 | Garvey | 297/389 |

FOREIGN PATENT DOCUMENTS

| 2,523,675 | 11/1975 | Germany | 297/388 |

*Primary Examiner*—James T. McCall
*Attorney, Agent, or Firm*—Ernest D. Buff; John P. Kirby

[57] ABSTRACT

A car seat is provided with a roll-up belt collecting apparatus adapted to relieve tension on the belt. The apparatus has a mechanically released locking means actuated in response to movement of a back rest disposed in the seat. The apparatus is inexpensive to produce and highly reliable in operation.

5 Claims, 2 Drawing Figures

CAR SEAT WITH SLACK ROLL-UP MECHANISM

BACKGROUND OF THE INVENTION

1. Field of the Invention

The invention concerns a car seat with slack roll-up mechanism, which is released by a device in the seat, so that further belt strap cannot be rolled up anymore.

2. Description of the Invention

In vehicles in general, and especially in motor vehicles, the belt strap which is to protect and hold passengers during an accident is fastened to an anchoring on one side (in the case of three-point safety belts on two sides), whereas the other end of the belt strap is taken up by a belt roller. The recently developed automatic roll-up mechanisms permit pulling of the belt strap from the roller even when the passenger has already fastened the seat belt, so that he can move freely, e.g. can lean forward and then back again. Only in an accident, be it on impact of the vehicle in any direction or in the case of turning over, the roll-up mechanism is locked; the roll-up device is held in place through latching or locking devices, so that the belt strap cannot be pulled out further and the passenger is held in place.

These automatic roll-up mechanisms are provided in most models with a tension spring, to keep the belt strap always with light tension on the body of the passenger. This assures that the belt strap is not laid too loosely or with excess slack around the passenger. The pull of the tension spring constantly exercises a certain pressure on the body which is uncomfortable during long rides. Therefore, an electric unit has already been proposed with which the spring tension of the roll-up mechanism is suspended in the moment when the belt wearer leans back against the back of the seat. This is done technically by a press button in the back seat which is actuated when leaning back. An electric circuit is closed and the current flowing through a solenoid lets a lock engage, so that the roll of the belt roller is arrested, no further strap is rolled up, and the uncomfortable tension pressure — especially on the chest of the passenger — stops.

Such an electrical system is, however, connected with technical expenditures and, therefore, considerable costs, aside from sources for malfunctioning due to the complexity of the system. The aim of the invention is to improve a vehicle seat of the mentioned type, so that a dependable lock is used — by purely mechanical means with the simplest construction — which prevents further roll-up of the belt strap and, thus, eliminates the uncomfortable pressure on the passenger.

SUMMARY OF THE INVENTION

According to the invention, the problem is solved so that in the at least partially swiveling back rest, a mechanical locking means is used, which will be actuated mechanically by the swivel movement of the back rest. The new back rest, equipped with this locking means, is maintenance-free, can be produced at lower cost and works dependably. According to the invention, the locking means is preferably attached to the roll-up mechanism in the back rest and has a ratchet wheel with reverse gears — pivotally attached to the swivel axis of the locking wheel — with which a latch attached to the back rest can be brought to grip lock. For this special version, the belt roller is attached in the back rest and without any electrical operation mechanical engaging between ratchet and ratchet wheel, as well as elimination of pull when leaning back, is made possible. This roll-up mechanism can be arranged very space-savingly and the stable levers and ratchets provide for safe functioning. The gearing of the ratchet wheel points into the opposite direction of the gearing of the normal locking wheel — located next to it or close to it; into its gears another ratchet — not belonging to the invention — will engage during an accident, to prevent a pull-out of the belt strap.

In another embodiment of the invention, the locking means has a nose clamp — attached to the swiveling back rest — directly engaging with the belt strap. The belt roller or another belt collecting device can either be attached as well in the so-called safety-seat in the back rest, or can be located underneath on the floor of the vehicle. It is further advantageous in this embodiment, if the belt strap is run at least in part along a vertical supporting surface in the back rest and if, at least one nose clamp — wedge-shaped in profile — is used for pressing the belt strap against the supporting area. The back rests of car seats are usually only approximately vertical and lean back to conform better with the sitting position of the passengers, so that the nose clamp presses the belt strap against the supporting area, through the weight of the passenger leaning back. Thus, at this clamping point, the permanent tension of the spring in the belt roller, is taken off, so that the belt strap running over a guide roller is without tension.

It is practical for the first embodiment of the invention — here the ratchet wheel with reverse gearing is attached to the roll-up mechanism — to have the upper part of the back rest be swivable around a stationary swivel axis through an oblong bracket, on which is permanently attached a ratchet jutting backwards to the ratchet wheel. This embodiment is very sturdy and can be directly operated through the movable part of the back rest, without the need for electrical systems.

BRIEF DESCRIPTION OF THE DRAWINGS

Further advantages, characteristics and possibilities of application of this invention result from the following description in connection with the drawings, wherein.

DESCRIPTION OF THE PREFERRED EMBODIMENTS

Figure 1:
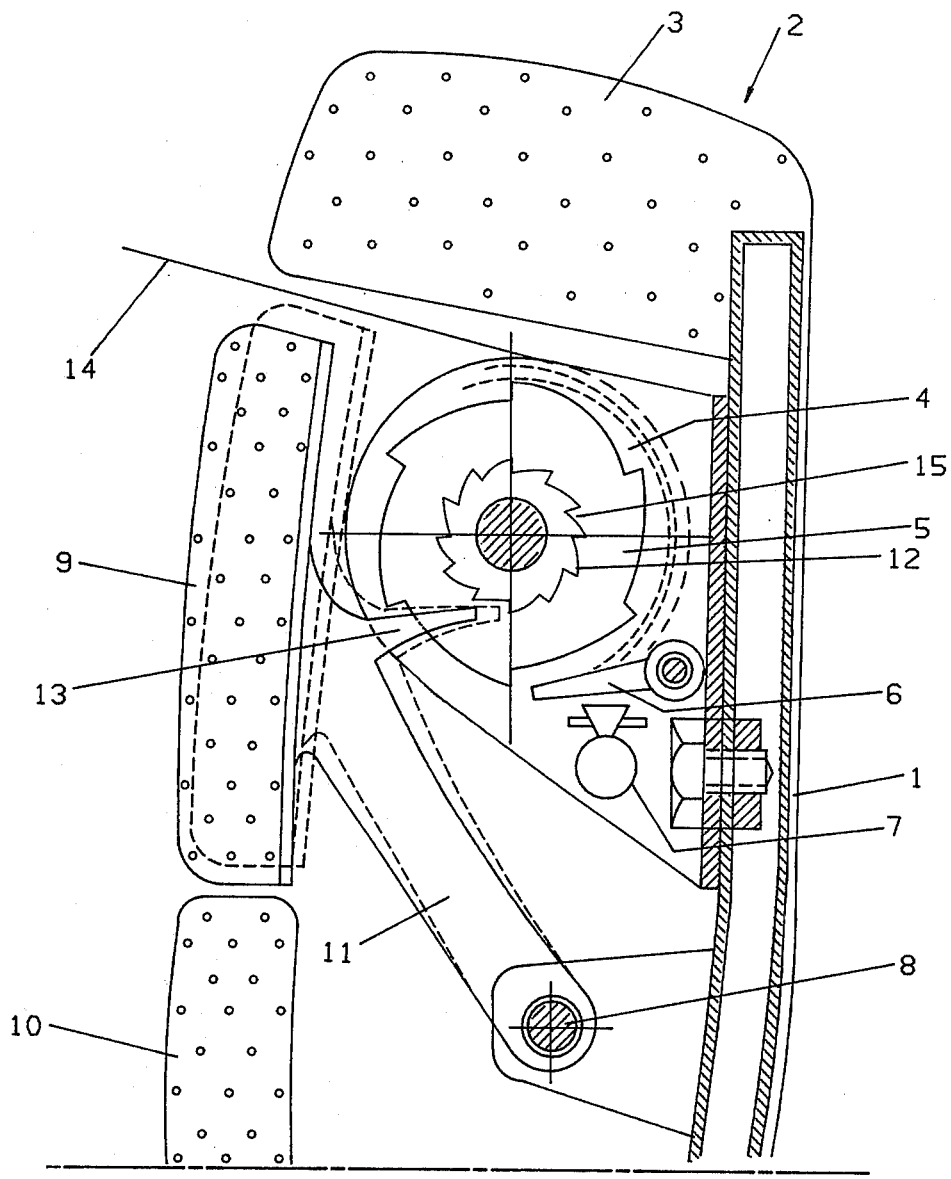
FIG. 1 is a cross-section of the upper part of a back rest with roll-up mechanism, and mechanical locking means according to the first embodiment.

To the supporting frame 1 of the back rest — generally numbered 2 — are attached the belt roller 4 with locking wheel 5, locking pawl 6 and release 7, in the first embodiment. Underneath, we find on support 1 the stationary swivel axis for the movable part 9 of the back rest 2, which is intended to be separate from a lower, stationary upholstery part 10.

According to FIG. 1, the moving part 9 is held by an elongated support bracket 11; in its upper part a ratchet 13 protruding back to the circumference of the ratchet wheel 12 — if necessary, the pawl 13 is made in one piece with the arm 11. It can be seen that the gearing of the ratchet wheel 12 is arranged in reverse to that of the locking wheel 5. The belt strap runs around the axis 15 — common to both wheels, the locking wheel 5, and the ratchet wheel 12 — and is led out of the back rest from underneath the upper part 3 and across the movable part of the back rest 9.

The locking wheel 5 of the belt roller 4 is not subject of the invention. During an accident it is locked by the pawl 6 which is moving up and thus prevents further pull-out of the belt strap 14.

The parts given in solid lines represent the normal position of the safety seat, when the passenger does not lean back against the back rest 2. After sitting down, the movable upholstery part 9 — and therefore the elongated arm 11 — are brought to the position shown by the dotted lines, by the passenger's leaning back. Pawl 13 engages in the gearing of the ratchet wheel 12, with which further take or pull of the belt strap 14 is prevented, due to the roll-up spring tension, which is not shown.

Figure 2:
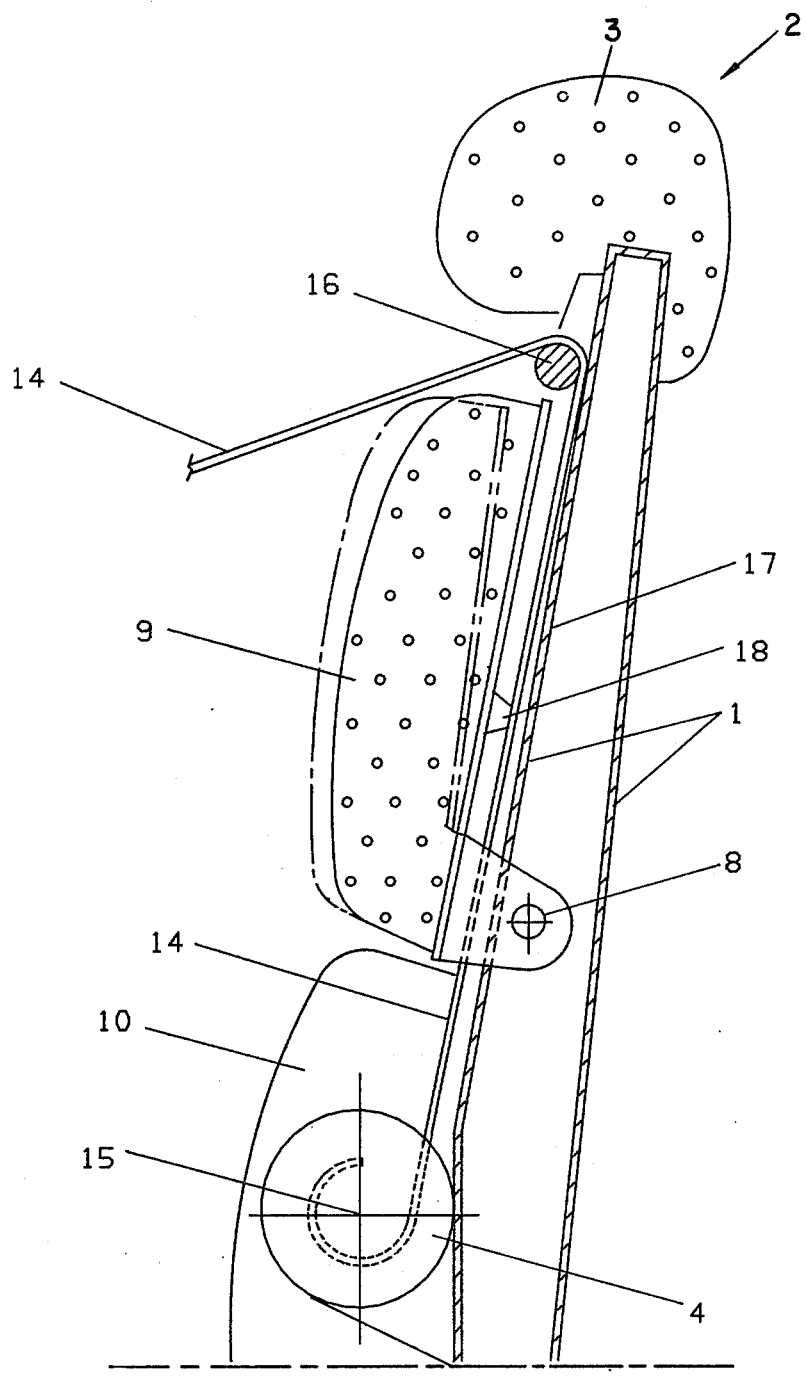
FIG. 2 a cross-section similar to FIG. 1, the locking means, however, is in the form of a nose clamp according to the second embodiment.

In the embodiment of FIG. 2, the belt roller 4 with swivel axis 15 is again attached to support 1, but here in the lower upholstery part 10.

The swivel axis 8 for the movable upholstery part 9 is also attached to the support 1. Between this and the upper upholstery, part 3 is also attached a guide roller 16, which ensures that the belt strap 14 runs along a support surface 17 in front of support 1, before the belt strap 14 is taken up by the belt roller in the known manner.

On the movable upholstery part 9 of the back rest 2, we find a wedge-shaped nose clamp 18, whose tip presses against the belt strap and the support area 17. The belt roller 4 in this embodiment of FIG. 2 does not need a ratchet wheel (as according to FIG. 1 the wheel 12); the roll-up spring is always active and exercises tension on the belt strap 14 in direction of roll-up. When the passenger sits down in the vehicle, he moves — on leaning back — the upper movable upholstery part 9 from its position (indicated with dotted lines) into the position shown in solid lines, and thus, presses the nose clamp 18 against the belt strap. At this clamping position, the tension of the spring in the belt roller 4 is taken up, so that the belt strap 14 above, running over guiding roller 14, is without tension.

I claim:

1. A car seat having a tension-free, roll-up belt collecting apparatus adapted to be actuated through a device arranged in the seat, so that further belt strap cannot be rolled up, said apparatus comprising a mechanically released locking means (12, 13; 17, 18) adapted to be actuated in response to the swiveling movement of the back rest (2, 9), said locking means being disposed in a back rest (2, 9) which is moving at least partly.

2. Car seat according to claim 1, wherein said locking device (12, 13) is attached to the roll-up apparatus (4, 5, 15) in the back rest (2), and comprises a ratchet wheel (12) with reverse gearing pivotally attached on the swivel axis (15) of the locking wheel (5), with which a ratchet (13) attached to the back rest (2, 9) will engage to lock.

3. Car seat according to claim 1, wherein said locking means (17, 18) has a nose clamp (18) attached to the movable back rest (2, 9), and adapted to be brought directly into contact with belt strap (14).

4. Car seat according to claim 2, wherein the upper part (9) of the back rest (2) is adapted to be swiveled around a stationary swivel axis (8) through an elongated support bracket (11), on which a ratchet (13) is firmly attached which protrudes backwards to the circumference of the ratchet wheel (12).

5. Car seat according to claim 3, wherein said belt strap (14) is run along an approximately vertical support area (17) in the back rest (2) and at least one wedge-shaped nose clamp (18) is used to press the belt strap (14) against the support area (17).

* * * * *